Sept. 6, 1949.  R. KERR  2,481,429
SAFETY HATCH OPERATING MECHANISM
Filed April 18, 1947
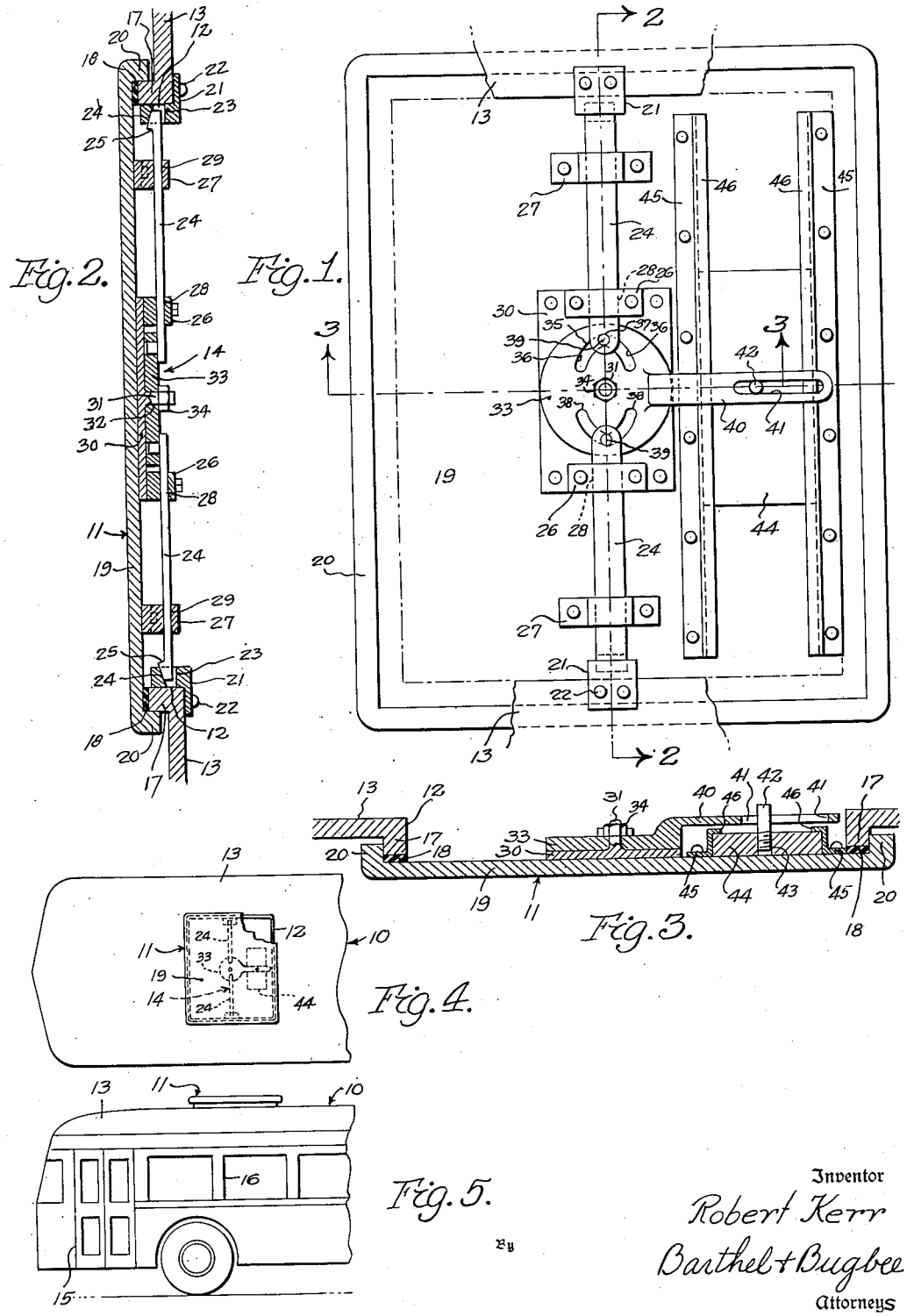
Inventor
Robert Kerr
Barthel + Bugbee
Attorneys Patented Sept. 6, 1949

2,481,429

UNITED STATES PATENT OFFICE 2,481,429

SAFETY HATCH OPERATING MECHANISM

Robert Kerr, Detroit, Mich.

Application April 18, 1947, Serial No. 742,263

3 Claims. (Cl. 292—21)

1

This invention relates to emergency escape exits, and in particular to safety hatches in vehicle roofs and operating mechanism therefor.

One object of this invention is to provide an operating mechanism for a vehicle roof safety hatch which operates automatically to unlatch the hatch in the event that the vehicle turns over on its side, thereby enabling the passengers to escape through the opening thus provided without the danger of their being trapped inside the vehicle.

Another object is to provide an operating mechanism for a vehicle roof safety hatch wherein the hatch is provided with oppositely movable latches which, in turn, are connected to a slidable weight by way of a rotary cam whereby the overturning of the vehicle onto its side will shift the sliding weight by means of gravity rotating the cam and unlatch the vehicle hatch.

Another object is to provide an operating mechanism for a vehicle roof safety hatch, as set forth in the preceding objects, wherein the latches engage keepers with a camming or wedging action such that the safety hatch is held firmly down against the roof, sealing the hatch opening against the entrance of moisture.

In the drawings,

Figure 1 is a bottom-plan view of a vehicle roof safety hatch and its operating mechanism according to a preferred form of the invention, with portions of the roof broken away to reveal the construction of the hatch;

Figure 2 is a longitudinal vertical section along the line 2—2 in Figure 1;

Figure 3 is a transverse vertical section along line 3—3 in Figure 1;

Figure 4 is a top-plan view of an end portion of a vehicle showing diagrammatically a roof safety hatch according to the present invention, with a portion of the hatch broken away to reveal the hatch opening; and Figure 5 is a side elevation of the portion of the vehicle shown in Figure 4.

Referring to the drawings in detail, Figures 4 and 5 show a vehicle, such as a motor bus, generally designated 10, having a safety hatch generally designated 11 mounted in an opening 12 in the roof 13 of the vehicle 10, the safety hatch 11 being operated by operating mechanism generally designated 14, according to a preferred form of the present invention. The vehicle 10 is provided with the usual door 15 and windows 16.

The opening 12 in the roof 13 (Figures 2 and 3) is surrounded by a coaming 17 topped by a resilient gasket 18 of rubber or the like. The hatch 11 has a plate-like central portion 19 and a downwardly-extending rim portion 20 which overlaps the coaming 17 and provides a seal against the entrance of moisture, in cooperation with the gasket 18.

The hatch 11 is releasably secured to the roof 13 by means of mechanism engaging a pair of keepers 21 which are secured as at 22 to the inside of the roof 13 immediately beneath the coaming 17. The keepers 21 are provided with sockets or recesses 23 having inclined wedging surfaces 24 (Figure 2). Cooperating with the recesses 23 are slidable latch bolts 24 having inclined wedging ends 25 engaging the inclined wedging surfaces 24 of the recesses 23 in the keepers 21. Accordingly, when the latch bolts 24 are pushed outward toward the keepers 21, the opposing wedging surfaces 24 and 25 cause the hatch 11 to be drawn downward more tightly against the gaskets 18.

The latch bolts 24 are guided in their reciprocation by spaced inner and outer guide brackets 26 and 27 having guide slots 28 and 29 respectively. The outer guide brackets 27 are bolted directly to the underside of the hatch 11, whereas the inner guide brackets 26 are bolted to a pivot plate 20 which, in turn, is bolted, welded or otherwise secured to the underside of the hatch 11.

Projecting from the central portion of the pivot plate 30 is a pivot stud 31 passing through a hole 32 in the center of a cam disc 33, the latter being held in place by a retaining nut 34, threaded upon the outer end of the stud 31. The cam disc 33 is provided with a pair of cam grooves or slots 35, each consisting of a pair of partially spiral arcuate portions 36 which, at their meeting points 37, are farther from the pivot stud 31 than at their opposite ends 38. The cam grooves or slots 35 are engaged by pins 39 mounted on the inner ends of the latch bolts 24 (Figure 2) and serving as cam followers. In practice, the pins 39 are equipped with rollers to reduce the friction, but for purposes of simplification, these rollers have been omitted and the pins 39 shown as directly engaging the cam groove or slots 36.

Extending radially outward from the cam disc 33 and integral therewith is an operating arm 40 having an elongated longitudinal slot 41. Engaging the slot 41 is a pin 42 threaded at its lower end (Figure 3) into a hole 43 drilled in the center portion of a sliding weight block 44. The weight block 44 is arranged to reciprocate in a direction crosswise of the vehicle and for this purpose is mounted in elongated guiding members 45 bolted to the inner side of the hatch 11 and having retaining flanges 46.

In the operation of the invention, let it be assumed that the hatch 11 is securely latched by the operating mechanism 14, and that the parts thereof are in the positions shown in Figures 1 to 4 inclusive. In this position, the pins or cam followers 39 are at their farthest positions from the pivot stud 31.

If, now, the vehicle 10 meets with an accident and accidentally turns over on its side, the hatch 11 will move into a vertical position along with the roof 13. When this occurs, the weight block 44 will slide downward in the now vertical guide members 45, carrying with it the pin 42 and swinging the arm 40. This action rotates the cam disc 33, causing the pins or cam followers 39 to be pulled inward toward the pivot stud 31 by reason of their engagement with the cam groove or slots 35, the inner ends 38 of which are nearer the pivot stud 31 than the meeting ends 37 of the separate portions 36 (Figure 1). As the pins 39 are pulled inward in this manner toward the pivot stud 31, they cause the latch bolts 24 to slide inward toward the stud 31, guided by the slots 28 and 29 in the guide brackets 26 and 27, and withdrawing the ends 25 of the latch bolts 24 from the recesses 23 in the keepers 21.

When the latch bolts 24 have thus been withdrawn from latching engagement with recesses 23, the hatch 11, thus freed from its locking connection with the vehicle roof 13, falls outward by its own weight and clears the opening 12 so that the passengers in the vehicle may escape. Thus, in case of the door 15 or windows 16 being jammed or inaccessible as a result of an accident in which a bus turns over on its side, the passengers will still be provided with an escape opening which is easily accessible, and which requires no climbing on the part of the passengers, some of whom may be injured and unable to climb. The safety hatch of this invention thus works automatically to free the otherwise trapped passengers, and enable them to escape quickly from the overturned bus, a matter of supreme importance if a bus catches fire. The hatch is, therefore, a valuable device for saving lives after vehicle accidents have occurred.

What I claim is:

1. An automatically-released latching device for a vehicle roof safety hatch comprising a latch keeper having a latch bolt receiving portion secured to the vehicle roof, a latch bolt slidably mounted on said hatch and having a cam follower connected thereto, a cam rotatably mounted on said hatch and having an arcuate cam shoulder thereon arranged at a varying distance from the axis of rotation thereof and engageable with said cam follower, an arm secured to said cam, and a movable weight operatively connected to said arm to shift said arm and rotate said cam in response to the motion of said hatch into a vertical position, said cam shoulder having two portions extending spirally inward in opposite directions from a common junction.

2. An automatically-released latching device for a vehicle roof safety hatch comprising two latch keepers mounted on opposite sides of the hatch opening, each keeper having a latch bolt receiving portion therein, two latch bolts slidably mounted on said hatch in alignment with said keepers and slidable simultaneously in opposite directions into and out of engagement therewith, a cam disc rotatably mounted on said hatch and having a pair of arcuate cam recesses therein arranged at varying distances from the axis of rotation thereof, said latch bolts having cam followers projecting therefrom into said cam recesses, an arm secured to said cam, and a movable weight operatively connected to said arm to shift said arm and rotate said cam in response to the motion of said hatch into a vertical position, each of said cam recesses having two branches extending spirally inward in opposite directions from a common junction.

3. An automatically-released latching device for a vehicle roof safety hatch comprising two latch keepers mounted on opposite sides of the hatch opening, each keeper having a latch bolt receiving portion therein, two latch bolts slidably mounted on said hatch in alignment with said keepers and slidable simultaneously in opposite directions into and out of engagement therewith, a cam disc rotatably mounted on said hatch and having a pair of arcuate cam recesses therein arranged at varying distances from the axis of rotation thereof, each of said cam recesses having two branches extending spirally inward in opposite directions from a common junction, said latch bolts having cam followers projecting therefrom into said cam recesses, an arm secured to said cam, a movable weight operatively connected to said arm to shift said arm and rotate said cam in response to the motion of said hatch into a vertical position, a guideway slidably receiving said weight secured to said hatch, and a sliding connection between said arm and said weight.

ROBERT KERR.

REFERENCES CITED

The following references are of record in the file of this patent:

UNITED STATES PATENTS

| Number | Name | Date |
|---|---|---|
| 248,086 | Cassidy | Oct. 11, 1881 |
| 950,551 | Ledoux et al. | Mar. 1, 1910 |
| 1,567,662 | Mack | Dec. 29, 1925 |
| 2,389,315 | Kerr | Nov. 20, 1945 |